Figure 5:
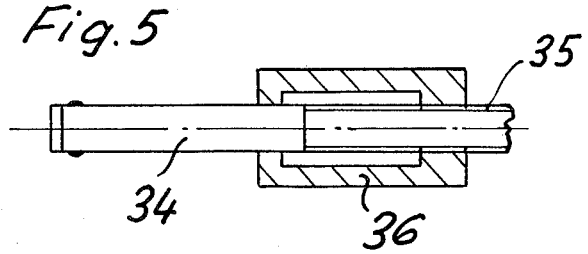

United States Patent [19]
Meier

[11] 3,909,951
[45] Oct. 7, 1975

[54] INTERNAL MEASURING APPARATUS
[75] Inventor: Johann Meier, Minusio, Switzerland
[73] Assignee: Premisura AG Instrumente fur Prazisions-Messung, Solothurn, Switzerland
[22] Filed: July 17, 1972
[21] Appl. No.: 272,143

[30] Foreign Application Priority Data
July 16, 1971 Switzerland...................... 11080/71

[52] U.S. Cl. ............................ 33/178 R; 33/174 Q
[51] Int. Cl.² .......................................... G01B 5/12
[58] Field of Search .......... 33/178 R, 174 Q, 172 B, 33/164 C

[56] References Cited
UNITED STATES PATENTS

| | | | |
|---|---|---|---|
| 1,429,556 | 9/1922 | Bartholdy........................ | 33/178 R |
| 1,465,295 | 8/1923 | Bartholdy........................ | 33/178 R |
| 2,456,497 | 12/1948 | Forsmark..................... | 33/178 R |
| 2,495,406 | 1/1950 | Buscher et al................... | 33/178 R |

FOREIGN PATENTS OR APPLICATIONS
138,823   1919   United Kingdom................... 33/178

*Primary Examiner*—Richard E. Aegerter
*Assistant Examiner*—Willis Little
*Attorney, Agent, or Firm*—Pierce, Scheffler & Parker

[57] ABSTRACT

Internal measuring apparatus for measuring small holes and the like having a probe provided with balls arranged to be moved outward from the probe axis to the surface to be measured, the movement of the balls is controlled by moving a pin which has corresponding oblique ball engaging bearing surfaces within the probe towards a second bearing surface having a plane at right angles to the probe axis, the balls lying between the bearing surfaces and being wedged outward by the action of the bearing surfaces; longitudinal axial movement of the pin is fed to a display device coupled to the probe.

4 Claims, 9 Drawing Figures

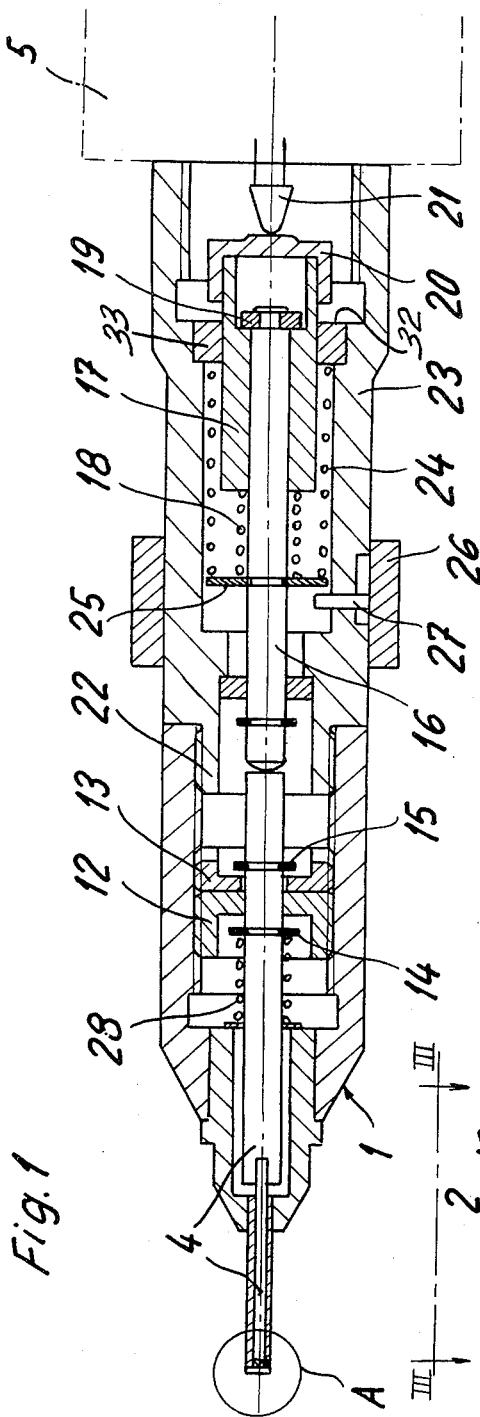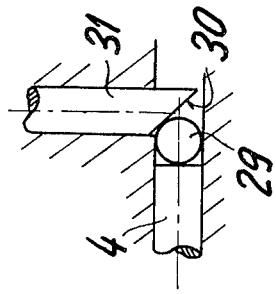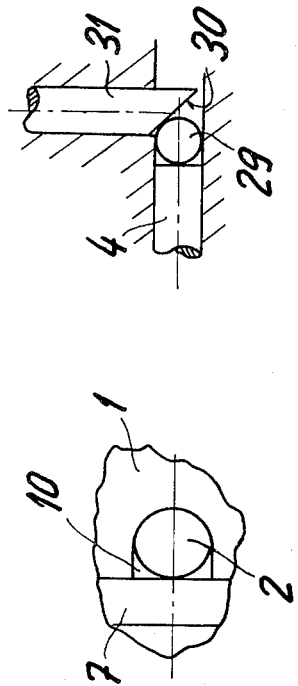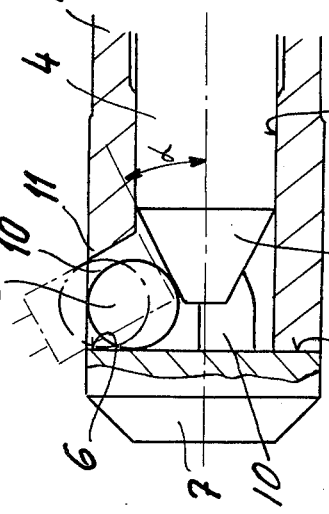

INTERNAL MEASURING APPARATUS

The present invention relates to an internal measuring apparatus having a probe. Such an apparatus is intended for measuring the diameter of very small holes of the order of 0.5 to 4 mm. Mechanically obtained measurements from the probe are passed to a display device to which the probe is attached. The display device can operate on a variety of different known ways such as by using a raster. Apparatus for making such measurement are known in which balls are moved outwards from a casing, but these have the drawback that the rolling surfaces are cylindrical in shape with the result that in the event of lateral displacement of the balls in their guides another measurement value is transmitted to the measurement pin. Furthermore the known apparatus are manufactured by using separate work process, for example by drilling holes for the balls in two or three steps in the casing. These inaccuracies for example the balls are not exactly in one plane, result in further measurement inaccuracies.

It is an object of the invention to provide apparatus with a probe in which the aforesaid are reduced or overcome.

The present invention therefore consists in apparatus for measuring small internal measurements comprising in combination:
 a. a display device
 b. a probe
 c. the probe is provided with a casing in which is mounted at least two balls,
 d. the balls being mounted within the probe in a plane perpendicular to the axis,
 e. means for moving the balls in the said plane comprising a pin axially mounted within the probe for longitudinal axial movement, which pin is provided with a bearing surface oblique to the axis, and a second bearing surface for each ball parallel to the perpendicular plane of mounting of the balls.
 f. means for transmitting the axial movement to the display device, whereby movement of all the balls in a same radial measuring plane is detected by the axial movement of the pin, which axial movement is transmitted to the display device to indicate an accurate measurement of diameter.

The second bearing surface for each ball may be formed as a common surface on a terminal member.

As the probe according to the invention is intended for measuring small bores the terminal member may be luted or soldered to the casing as this method requires the least space.

In order to avoid damage to the measurement apparatus or the tip of the probe provided with balls the pin or a transmission pin in operative connection therewith may be connected in displaceable manner with a displacement member which is in contact with the measurement apparatus, and resilient means are provided to allow a relative displacement between the pin or transmission pin and the displacement member when a specific force acting on the pin or transmission pin or displacement member is exceeded. It is expedient in such a case if the pin or the transmission pin in operative connection therewith is longitudinally displaceable in the displacement member which is housed so as to be displaceable parallel to its longitudinal axis, that resilient means are provided between the pin or the transmission pin and the displacement member, these serving to cause the displacement member to lie against a stop member of the pin or transmission pin, and preferably second resilient means are provided, these acting on the pin or transmission pin and pressing the pin in the direction of the balls.

The invention further consists in a method for manufacturing the probe for the apparatus according to the invention in which ball guides intended for the balls are produced by displacing a rotating cylindrical tool, the longitudinal axis of which is compared with the rolling surface inclined outwardly against it, parallel to the longitudinal axis of the casing from the end of the casing, and the terminal member is then attached to the latter by means of soldering, luting or welding. It is expedient in this case that a milling cutter or grinding tool adapted to be inclined by 15° to 40°, preferably 30°, relative to the rolling surface is displaced parallel to the longitudinal axis of the casing.

Figure 6:
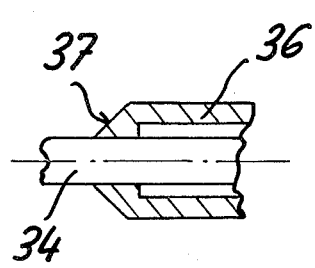
Figure 7:
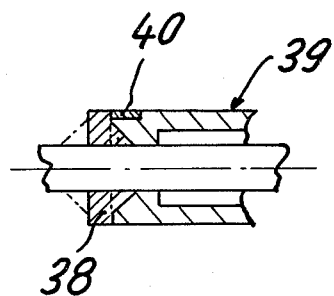
Figure 8:
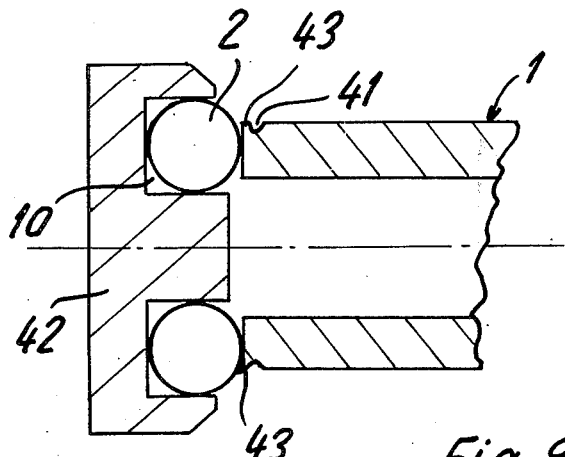

The invention is explained by way of example below with the help of the drawing. There are shown:

FIG. 1 a longitudinal section through a form of embodiment given by way of example of a probe according to the invention;

FIG. 2 representation on an enlarged scale of area A in FIG. 1;

FIG. 3 a view along line III—III in FIG. 2;

FIG. 4 an arrangement for diverting the measurement motion;

FIGS. 5, 6 and 7 on an enlarged scale various forms of embodiment of a stop member;

FIG. 8 a section analogous to FIG. 2; and

Figure 9:
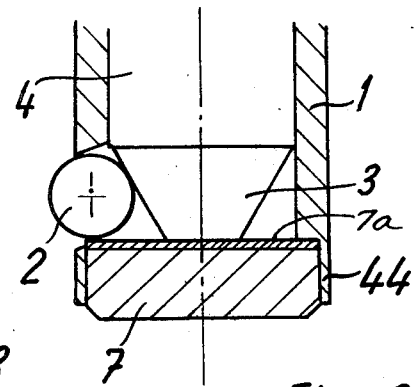

FIG. 9 a section analogous to FIG. 2 to show a centred attachment of the terminal member.

The probe for an internal measurement apparatus shown in the drawing has three balls 2 housed in radially displaceable manner in a casing 1, the movement of which is adapted to be transmitted in radial direction via a frusto-pyramidal member 3 of an axially displaceable pin 4 on to the measurement apparatus 5.

The rolling surfaces 6 intended for the balls and running perpendicular to the axis of the pin are formed by a joint surface of a terminal member 7 attached to the casing 1, the rolling surfaces 6 lying in the same plane as the dividing surface 8 located between the terminal member 7 and the casing 1 and no part of terminal member 7 projects in an axial direction out over the rolling surfaces 6 in the direction of the casing 1. In this way it is possible to immediately bring the rolling surfaces 6 intended for the balls 2 exactly into a joint plane, which is the basic requirement for exact measurement, the front face of the terminal member being provided for example with a single exactly ground and lapped surface.

If it desired to design a probe which can measure for example bores with a diameter of 0.8 mm, terminal member 7 is luted to casing 1, as it has never been possible to design anything so small using attachment screws.

The diameter of the balls 2 and the bore 9 of the casing 1 serving to receive the pin 4 are so measured that the balls 2 can be introduced, when pin 4 is removed from casing 1, through the bore 9 intended for the latter into the ball guides 10 located in the casing 1. This makes it possible to introduce the balls 2 after the luting fast of the terminal member 7 or to exchange them in the event of damage.

The ball guides 10 intended for the balls in the casing 1 are most expediently produced by displacing a rotating cylindrical milling cutter, whose longitudinal axis is inclined by 6° to 30° outwards relative to the rolling surfaces 6, and parallel to the longitudinal axis of the casing from the end of the casing. In this way the wall of casing 1 is provided with a lip 11 which prevents the balls 2 falling out of the casing 1.

Furthermore the pin 4 is provided with two stop members 14 and 15 which co-operate via adjusting nuts 12 and 13 with casing 1, these so limiting the displacement tract of the pin 4 that on the one hand the frusto-pyramidal member 3 does not come out of engagement with the balls 2, as otherwise at least one of the balls 2 could pass out of the associated ball guide 10 into the bore 9, but on the other hand the balls 2 cannot be pressed out of the casing 1 when pressure is applied to the lip 11. The exact stop positions can be exactly set by means of adjusting nuts 12 and 13.

Instead of the stop member 15 the frusto-pyramidal member 3 can also be so measured in its axial length that when the latter lies against the terminal member 7 the balls 2 arranged in ball guides 10 are in their extreme measurement position which is shown with a dot-dash line in FIG. 2.

In order to prevent the balls 2 from rolling grooves into the rolling surfaces 6 after a relatively short period of use, which would result in measurement inaccuracies, the terminal member 7 is preferably provided with a sapphire or hard metal disc 7a. The whole terminal member 7 can also of course consist of a sapphire or hard metal disc.

The probe can, as shown, have three balls arranged offset 120° from each other to measure round bores or two balls diametrically opposed to each other to measure oval bores.

In order to prevent the possibility of excessive pressure being exercised on the measurement apparatus 5 or the frusto-pyramidal member 3 a transmission pin 16 adjacent to the pin 4 is connected in displaceable manner with a displacement member 17 which is in operative connection with the measurement apparatus, a spring 18 being housed between the latter and the transmission pin 16, which, when a specific force acting on the pin 4 or the transmission pin 16 or displacement member 17 is exceeded allows a relative displacement between the two latter members, and on the other hand acts in such a way that the displacement member 17 lies against the stop member 19 which is attached to the end of the transmission pin 16 with the result that the displacement of the balls 2 is transmitted without play and with complete accuracy via the pin 4, the transmission pin 16, and the displacement member 17 and the measurement apparatus stop member 20 connected to the latter to the measurement pin 21 of the measurement apparatus 5. To limit the displacement track of the displacement member 17 against the balls 2 the stop member 20 is so measured and designed that after a specific displacement distance it lies against a stop surface 32 of a guide ring 33 housed in the casing 23.

The displacement member 17 which is coupled to the transmission pin 16 is displaceably housed in a housing member 23 connected in detachable manner to the casing 1 via the thread connection 22, with the resultant advantage that there is no need to create a corresponding number of complete probes for various measurement ranges, but it is possible to exchange only casing 1 together with the parts associated therewith for another casing with the desired measurement range.

There is further a second pressure spring 24 housed in casing member 23 which via a stop member 25 attached to the transmission pin 16 presses the transmission pin 16 in the direction against the pin 4. When measuring a bore by means of the probe which is connected with a measurement apparatus 5 the procedure is such that the lifting ring 26 which is housed on casing member 23 and which is connected to a lifting pin 27 which projects into the inside of the casing member 23 and glides in a helical groove of casing member 23 is used to lift the transmission pin 16 against the force of spring 24, while lifting ring 26 is rotated, the measurement part of the probe which is provided with balls 2 is then introduced into the bore which is to be measured, after which by rotating the lifting ring 26 in the direction opposite to that of the preceding rotation the transmission pin 16 is again released, this causing the balls 2 to be pressed against the wall of the bore to be measured. A pressure spring 28 housed in the casing 1 and co-operating with stop member 14 ensures that when the transmission pin 16 is lifted pin 4 is also lifted.

It is of course possible to so design the probe that the casing member 1 and casing 23 together with pin 4 and transmission pin 26 comprise one piece each.

If the probe together with the measurement apparatus 5 need too much space in an axial direction it is also possible, as shown in FIG. 4, to divert the displacement motion of the pin 4 e.g. by 90°, the end of pin 4 having a ball member 29 associated with it which lies against an abutting surface 30 of a further pin 31 or of the transmission pin 16 inclined by 45° against the axis of the pin.

In order to make it possible for the diameter of the bore to be measured to be read directly off at the measurement apparatus 5, the tangent of the angle of inclination between the jacket surface 32 and the axis of the pin is 0.5, i.e. a displacement by $x$ of one ball 2 results in a displacement of pin 4 by $2x$, this matching the change in diameter.

So that it is possible to take a series of measurements at the same depth in the bore it can be expedient if, as can be seen from FIG. 5, a stop member 36 adapted to be adjusted via a thread 35 is housed on the introductory member 34 of casing 1. This stop member 36 can, as is seen from FIG. 6, also be provided with a frusto-pyramidal centring surface 37, with the result that when the latter lies against the input aperture of the bore which is to be measured the longitudinal axis of the probe is absolutely certain to coincide with the longitudinal axis of the bore.

A combination of the stop members shown in FIGS. 5 and 6 can be seen in FIG. 7, where the front part 38 of stop member 39 can be arranged in two different ways, as shown by the solid and the dot-dash lines. The front part 38 can be connected via a thread or with the help of a magnet 40 to the other part of the stop member 39 in a non-positive manner.

In order to prevent the balls 2 being able to fall out of the ball guides 10 it is also possible to proceed as shown in FIG. 8, in which casing 1, as can be seen from the top half, is provided above the ball guides 10 with a groove 41, the balls 2 then being held fast at their extreme position with the help of a retaining member 42, the lip 43, as can be seen from the lower half of FIG. 8 dipping down towards the balls 2, with the result that depending on the arrangement of the terminal member and in the ready-mounted state of the probe it is impossible for the balls 2 to fall out.

FIG. 9 shows another way of attaching the terminal member 7, in which a very thin centring member 44 serves to centre the terminal member 7 when this is luted to the casing 1.

If the balls are prevented from falling out by corresponding configuration of the ball guides then it has previously always been necessary when exchanging the balls to detach the part containing the ball guides or the parts adjacent thereto by means of screws from the other part of the probe. However, by the construction in accordance with the invention it is possible to make the probe so small that bores of the order of 1 to 4 mm diameter for example can be measured.

I claim:

1. A probe for use with internal measurement apparatus comprising at least two balls housed in a radially displaceable manner within a casing, said casing being provided with an axially displaceable pin including oblique surfaces at one end thereof in contact respectively with said balls for converting radial movement of said balls into axial displacement of said pin and vice versa, rolling surfaces for said balls extending perpendicular to the axis of said pin being formed by a flat surface of a terminal member permanently secured to the end of said casing, said rolling surfaces lying in the same plane as the dividing surface located between said terminal member and said casing such that no part of said terminal member projects in an axial direction over said rolling surfaces in the direction of said casing thereby bringing said rolling surfaces exactly into a joint plane, the diameter of said balls and the bore of said casing which receives said pin being so dimensioned that upon removal of said pin from the bore in said casing said balls can be introduced through said bore into ball guides located within said casing thereby making possible introduction of the balls after securing said terminal member to the end of said casing or to exchange the balls in the event of damage thereto, said pin being further provided with axially spaced stop members cooperative respectively with axially spaced stop surfaces located internally of said casing for limiting displacement of said pin in one direction such that the said oblique surfaces on said pin cannot disengage from said balls and also for limiting displacement of said pin in the opposite direction such as to prevent said balls from being pressed out of said ball guides beyond a ball-retaining lip provided on said casing, a displacement member mounted in said casing for actuation longitudinally of said casing and which is coupled to said pin, one end of said displacement member being in contact with a linking means of an apparatus for measuring the displacement of said pin, and resilient means interposed in said coupling between said pin and displacement member and which serves to permit relative movement therebetween whenever a specific force acting upon said pin is exceeded.

2. A probe as claimed in claim 1 wherein said coupling between said pin and displacement member includes a force transmission pin coaxial with and having an end thereof in contact with the opposite end of said pin for movement longitudinally of said casing by sliding movement within said displacement member, and wherein said resilient means includes a first compression spring surrounding a portion of said force transmission pin, one end of said compression spring bearing against a stop on said force transmission pin and the other end of said spring bearing against the opposite end of said displacement member, and a second compression spring surrounding said first compression spring, one end of said second compression spring bearing against a fixed stop within said casing and the opposite end of said second compression spring bearing against said stop on said force transmission pin so as to spring load said pin in the direction of said balls.

3. A probe as defined in claim 2 and which further includes lifting means actuatable from the exterior of said casing and which serve to disengage the end of said force transmission pin from the end of the pin which is actuatable by said balls.

4. A probe as defined in claim 3 wherein said lifting means includes a lifting pin projecting into said casing and actuated longitudinally thereof by means of a lifting ring secured thereto, said lifting pin being engageable with said stop member on said force transmission pin for disengaging the end of the latter from the end of the pin which is actuatable by said balls.

* * * * *